United States Patent
Lin et al.

(10) Patent No.: US 10,103,616 B1
(45) Date of Patent: Oct. 16, 2018

(54) FLYBACK POWER CONVERTER CIRCUIT WITH ACTIVE CLAMPING AND ZERO VOLTAGE SWITCHING AND CONVERSION CONTROL CIRCUIT THEREOF

(71) Applicant: RICHTEK TECHNOLOGY CORPORATION, Zhubei, Hsinchu (TW)

(72) Inventors: Kun-Yu Lin, Pingtung (TW); Tzu-Chen Lin, Changhua (TW); Wei-Hsu Chang, Hsinchu (TW); Ta-Yung Yang, Taoyuan (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 0 days.

(21) Appl. No.: 15/878,483

(22) Filed: Jan. 24, 2018

Related U.S. Application Data

(60) Provisional application No. 62/486,764, filed on Apr. 18, 2017.

(30) Foreign Application Priority Data

Jul. 20, 2017 (TW) .............................. 106124274 A

(51) Int. Cl.
  *H02M 1/08* (2006.01)
  *H02M 3/335* (2006.01)

(52) U.S. Cl.
  CPC ....... *H02M 1/083* (2013.01); *H02M 3/33569* (2013.01)

(58) Field of Classification Search
  CPC ............. H02M 1/083; H02M 3/33507; H02M 3/33523; H02M 3/33569; H02M 3/33576; H02M 3/33592; H02M 2001/0032; Y02B 70/1433; H05K 13/04; H05K 3/00; B21D 43/00; B21D 43/12; B21D 43/24
  USPC ........................................................ 363/21.03
  See application file for complete search history.

(56) References Cited

U.S. PATENT DOCUMENTS

| | | | | |
|---|---|---|---|---|
| 8,000,112 B2 * | 8/2011 | Zhang | ..................... | H02M 1/34 363/21.01 |
| 8,581,147 B2 * | 11/2013 | Kooken | ................. | B23K 9/095 219/137.7 |
| 8,693,223 B2 * | 4/2014 | Lin | ................... | H02M 3/33507 363/21.03 |
| 2012/0069607 A1 * | 3/2012 | Shekhawat | ....... | H02M 3/33584 363/21.05 |

* cited by examiner

*Primary Examiner* — Yemane Mehari
(74) *Attorney, Agent, or Firm* — Tung & Associates

(57) ABSTRACT

A flyback power converter circuit includes: a transformer, including a primary winding coupled to an input power and a secondary winding coupled to an output node; a primary side switch coupled to the primary winding for switching the input power to generate an output power on the output node through the secondary winding; a clamping circuit including an auxiliary switch and an auxiliary capacitor which are connected in series to form an auxiliary branch which is connected with the primary winding in parallel; and a conversion control circuit adjusting an auxiliary dead time according to a primary side switch related signal and a switching voltage related signal such that the primary side switch is zero voltage switching at a time point when the primary side switch is turned ON.

24 Claims, 7 Drawing Sheets

FLYBACK POWER CONVERTER CIRCUIT WITH ACTIVE CLAMPING AND ZERO VOLTAGE SWITCHING AND CONVERSION CONTROL CIRCUIT THEREOF

CROSS REFERENCE

The present invention claims priority to U.S. 62/486,764, filed on Apr. 18, 2017 and TW 106124274, filed on Jul. 20, 2017.

BACKGROUND OF THE INVENTION

Field of Invention

The present invention relates to a flyback power converter circuit; particularly, it relates to a flyback power converter circuit with active clamping and zero voltage switching. The present invention also relates to a conversion control circuit for use in the flyback power converter circuit.

Description of Related Art

FIG. 1 shows a prior art flyback power converter circuit with active clamping (flyback power converter circuit 1). The flyback power converter circuit 1 converts an input voltage to an output voltage. The flyback power converter circuit 1 includes an auxiliary switch S2 and an auxiliary capacitor Cr which form an active clamping branch. The active clamping branch is ON when the primary side switch S1 is OFF, such that the energy stored in the parasitic leakage inductance Lr and the parasitic magnetizing inductance Lm during the ON time of the primary side switch S1 can be discharged and stored in the auxiliary capacitor Cr by this branch. Besides, before the primary side switch S1 is turned ON, the parasitic capacitor Coss of the primary side switch S1 can be discharged by the energy stored in the auxiliary capacitor Cr, such that the primary side switch S1 is zero voltage switching when it is turned ON. In this prior art, the auxiliary switch S2 switches complementarily with the primary side switch S1 as shown in FIG. 2A.

FIG. 2B shows schematic waveforms of another prior art flyback power converter circuit with active clamping. This prior art is similar to FIG. 1 but is different in that the ON time TON2 of the auxiliary switch S2 is a constant time period (constant ON time).

The prior art circuits in FIGS. 1 and 2A-2B have a drawback that the dead time Td between the ON time periods of the auxiliary switch S2 and the primary side switch S1 is fixed length, and therefore the time point when the primary side switch S1 is turned ON may not be a right timing for zero voltage switching (i.e. the time point when the parasitic capacitor Coss is just fully discharged). The power loss may increase due to missing the right timing.

Compared to the prior art in FIGS. 1 and 2A-2B, the present invention is advantageous in that the dead time Td between the ON time periods of the auxiliary switch S2 and the primary side switch S1 is adjustable to ensure that the primary side switch S1 switches by zero voltage switching so that the power conversion efficiency can be improved.

SUMMARY OF THE INVENTION

From one perspective, the present invention provides a flyback power converter circuit, comprising: a transformer, which includes a primary side winding electrically coupled to an input power and a secondary side winding coupled to an output node, wherein the input power includes an input voltage; a primary side switch, coupled to the primary side winding, and is configured to operably switch the primary side winding to convert the input power such that the secondary side winding generates an output power on the output node, wherein the output power includes an output voltage; a clamping circuit, including: an auxiliary switch; and an auxiliary capacitor, coupled to the auxiliary switch in series to form an auxiliary branch which is coupled with the primary side winding in parallel; and a conversion control circuit, including: an auxiliary switch control circuit, configured to operably generate an auxiliary switch control signal to control the auxiliary switch; and an adjusting circuit, configured to operably adjust an auxiliary dead time, such that a voltage difference between a current inflow terminal and a current outflow terminal of the primary side switch is substantially zero at a time point when the primary side switch is turned ON, whereby zero voltage switching is achieved; wherein the auxiliary dead time is a time period starting from when the auxiliary switch is turned OFF till when the primary side switch is turned ON for the next time, wherein both the auxiliary switch and the primary side switch are OFF during the auxiliary dead time.

In one embodiment, the adjusting circuit generates an adjusting signal according to a primary side switch related signal and a zero voltage signal to adjust the auxiliary dead time, such that the primary side switch is zero voltage switching at the time point when the primary side switch is turned ON; wherein the primary side switch related signal relates to a primary side switch control signal which controls the primary side switch; wherein the zero voltage signal is configured to represent a zero crossing time point which indicates a time point when the voltage difference between the current inflow terminal and the current outflow terminal of the primary side switch is reaching or crossing zero.

In one embodiment, the conversion control circuit further includes a zero voltage signal generator circuit configured to operably determine the zero crossing time point according to a switching voltage related signal and generate the zero voltage signal to represent the zero crossing time point; wherein the switching voltage related signal relates to the voltage difference between the current inflow terminal and the current outflow terminal of the primary side switch.

In one embodiment, the adjusting circuit adjusts the auxiliary dead time by the adjusting signal, such that a primary side turning ON time point substantially aligns the zero crossing time point, whereby the primary side switch is zero voltage switching when turning ON, wherein the primary side turning ON time point is a time point when the primary side switch related signal indicates that the primary side switch is turned ON.

In one embodiment, the clamping circuit further includes a timing control circuit which is configured to operably generate the primary side switch control signal according to the auxiliary switch control signal and the adjusting signal to control the primary side switch, wherein the timing control circuit determines a dead time adjustment amount of the auxiliary dead time according to the adjusting signal to adjust the auxiliary dead time, and at the time point when the auxiliary dead time ends, the primary side switch is controlled to turn ON by the primary side switch control signal; wherein the adjusting circuit generates the adjusting signal according to a phase difference of the zero voltage signal and the primary side switch related signal such that the primary side turning ON time point substantially aligns the zero crossing time point.

In one embodiment, when the phase difference indicates that the zero crossing time point is later than the primary side turning ON time point, the auxiliary dead time is lengthened, and when the phase difference indicates that the zero crossing time point is earlier than the primary side turning ON time point, the auxiliary dead time is shortened.

In one embodiment, the zero voltage signal generator circuit includes: a sensing circuit, configured to operably sense the switching voltage related signal to generate a zero voltage sensing signal; and a comparison circuit, configured to operably compare the zero voltage sensing signal with a reference voltage to generate the zero voltage signal.

In one embodiment, the timing control circuit includes: a variable current source, whose current is adjustable according to the adjusting signal; and an integration capacitor, configured to determine the auxiliary dead time according to the current of the variable current source.

In one embodiment, the adjusting circuit includes a first state control circuit which generates an increasing signal according to a level switching time point of the zero voltage signal and a level switching time point of the primary side switch related signal and a second state control circuit which generates a decreasing signal according to the level switching time point of the zero voltage signal and the level switching time point of the primary side switch related signal, wherein the adjusting signal includes the increasing signal and the decreasing signal.

In one embodiment, the flyback power converter circuit generates a primary side switch driving signal according to the primary side switch control signal, wherein the primary side switch driving signal is directly coupled to a control terminal of the primary side switch to drive the primary side switch, wherein: (1) the primary side switch related signal is coupled to the primary side switch driving signal; or (2) the primary side switch related signal is coupled to a delayed control signal, wherein the conversion control circuit includes a delay circuit which is configured to operably generate the delayed control signal according to the primary side switch control signal, wherein the delayed control signal is not the primary side switch driving signal, and the delayed control signal is delayed by a predetermined delay time in comparison to the primary side switch control signal, such that the delayed control signal and the primary side switch driving signal are substantially in-phase.

In one embodiment, the primary side switch is coupled to the primary side winding on a switching node which includes a switching voltage, wherein the switching voltage related signal is generated by one of the followings: (1) that the switching voltage related signal is electrically connected to the switching voltage; (2) that the flyback power converter circuit further includes a sensing capacitor, and the conversion control circuit further includes a bias circuit configured to operably provide a DC bias on a bias node, wherein the sensing capacitor is coupled between the bias node and the switching node to generate the switching voltage related signal on the bias node; or (3) that the transformer further includes an auxiliary winding to generate the switching voltage related signal.

In one embodiment, the auxiliary switch and the primary side switch do not switch complementarily to each other.

From another perspective, the present invention provides a conversion control circuit, configured to operably control a flyback power converter circuit which includes: a transformer, which includes a primary side winding electrically coupled to an input power and a secondary side winding coupled to an output node, wherein the input power includes an input voltage; a primary side switch, coupled to the primary side winding, and is configured to operably switch the primary side winding to convert the input power such that the secondary side winding generates an output power on the output node, wherein the output power includes an output voltage; a clamping circuit, including: an auxiliary switch; and an auxiliary capacitor, coupled to the auxiliary switch in series to form an auxiliary branch which is coupled with the primary side winding in parallel; the conversion control circuit comprising: an auxiliary switch control circuit, configured to operably generate an auxiliary switch control signal to control the auxiliary switch; and an adjusting circuit, configured to operably adjust an auxiliary dead time, such that a voltage difference between a current inflow terminal and a current outflow terminal of the primary side switch is substantially zero when turning ON, whereby zero voltage switching is achieved; wherein the auxiliary dead time is a time period starting from when the auxiliary switch is turned OFF to when the primary side switch is turned ON for the next time, wherein both the auxiliary switch and the primary side switch are OFF during the auxiliary dead time.

The objectives, technical details, features, and effects of the present invention will be better understood with regard to the detailed description of the embodiments below.

DESCRIPTION OF THE PREFERRED EMBODIMENTS

The drawings as referred to throughout the description of the present invention are for illustration only, to show the interrelations between the circuits and the signal waveforms, but not drawn according to actual scale.

Figure 1:
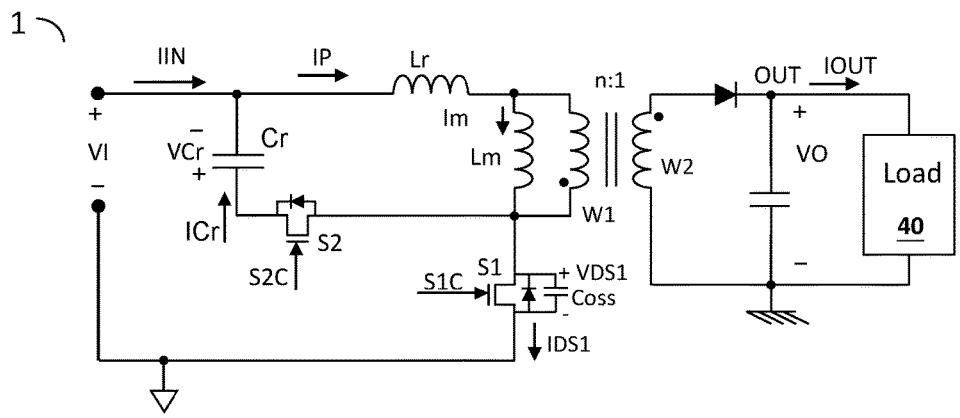
FIG. 1 shows a schematic diagram of a prior art flyback power converter circuit with active clamping.
Figure 2A:
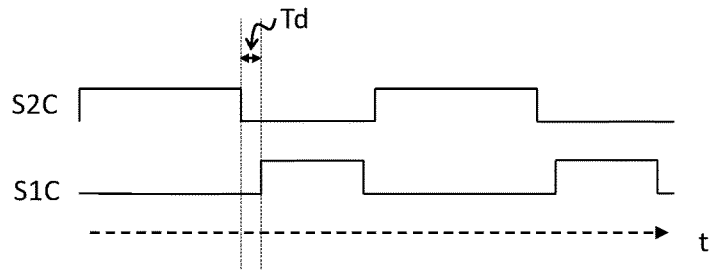
FIG. 2A shows schematic waveforms of a prior art flyback power converter circuit with active clamping.
Figure 2B:
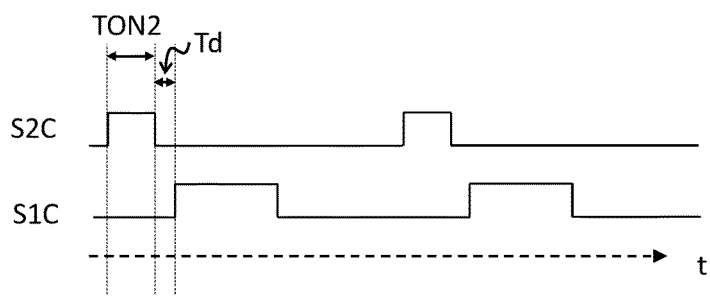
FIG. 2B shows schematic waveforms of another prior art flyback power converter circuit with active clamping.
Figure 3:
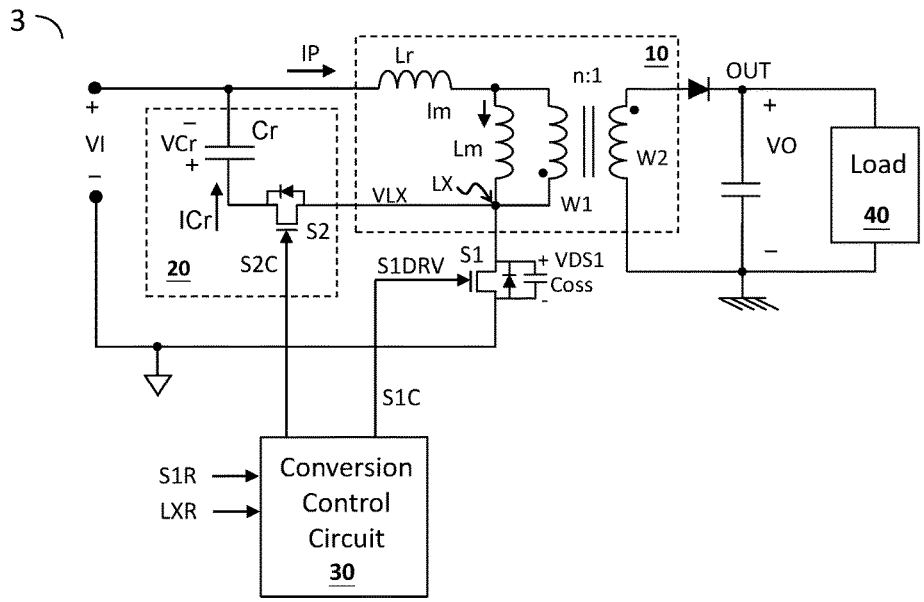
FIG. 3 shows a schematic diagram of an embodiment of the flyback power converter circuit with active clamping and zero voltage switching according to the present invention.

FIG. 3 shows one embodiment of the flyback power converter circuit with active clamping and zero voltage switching according to the present invention (flyback power converter circuit 3). The flyback power converter circuit 3 comprises a transformer 10, a primary side switch S1, and a conversion control circuit 30. The transformer 10 includes a primary side winding W1 which is electrically coupled to an input power and a secondary side winding W2 which is coupled to an output node OUT, wherein the input power includes an input voltage VI. The primary side switch S1 is coupled to the primary side winding W1, and is configured to operably switch the primary side winding W1 to convert the input power such that the secondary side winding W2 generates an output power on the output node OUT, wherein the output power includes an output voltage VO.

Still referring to FIG. 3, the clamping circuit 20 includes an auxiliary switch S2 and an auxiliary capacitor Cr. The auxiliary switch S2 is coupled to the auxiliary switch in series to form an auxiliary branch which is coupled with the primary side winding W1 in parallel as shown in FIG. 3. The conversion control circuit 30 generates a primary side control signal S1C and an auxiliary control signal S2C to control the primary side switch S1 and the auxiliary switch S2 respectively to convert the input power to the output power. The auxiliary switch S2 is ON for a period of time within an OFF period of the primary side switch S1, such that the energy stored in the parasitic leakage inductance Lr and/or the parasitic magnetizing inductance Lm of the primary side winding W1 during the ON time of the primary side switch S1 can be discharged and stored in the auxiliary capacitor Cr by this branch. Besides, before the primary side switch S1 is turned ON, the parasitic capacitor Coss of the primary side switch S1 can be discharged by the energy stored in the auxiliary capacitor Cr, such that the primary side switch S1 is zero voltage switching when turning ON.

According to the present invention, the conversion control circuit 30 adjusts an auxiliary dead time of the auxiliary switch S2 according to a primary side switch related signal S1R and a switching related signal LXR, such that a voltage difference (e.g. VDS1 shown in FIG. 3) between a current inflow terminal (e.g. the switching node LX shown in FIG. 3) and a current outflow terminal (coupled to the primary side ground in this embodiment) of the primary side switch S1 is substantially zero at the time point when the primary side switch S1 is turned ON, whereby zero voltage switching is achieved. The primary side switch related signal S1R relates to the primary side switch control signal S1C. The switching voltage related signal LXR relates to the voltage difference between the current inflow terminal and the current outflow terminal of the primary side switch S1. In one embodiment, the switching voltage related signal LXR relates to a switching voltage VLX on the switching node LX. The auxiliary dead time (TD FIG. 7) refers to a time period starting from when the auxiliary switch S2 is turned OFF till when the primary side switch S1 is turned ON for the next time. The primary side switch related signal S1R and the switching voltage related signal LXR may be embodied in various methods which will be described in detail later. From one perspective, any means for adjusting the auxiliary dead time so that the primary side switch is zero voltage switching should be considered within the scope of the present invention, as long as the auxiliary dead time is adjusted for the purpose of zero voltage switching.

Figure 4:
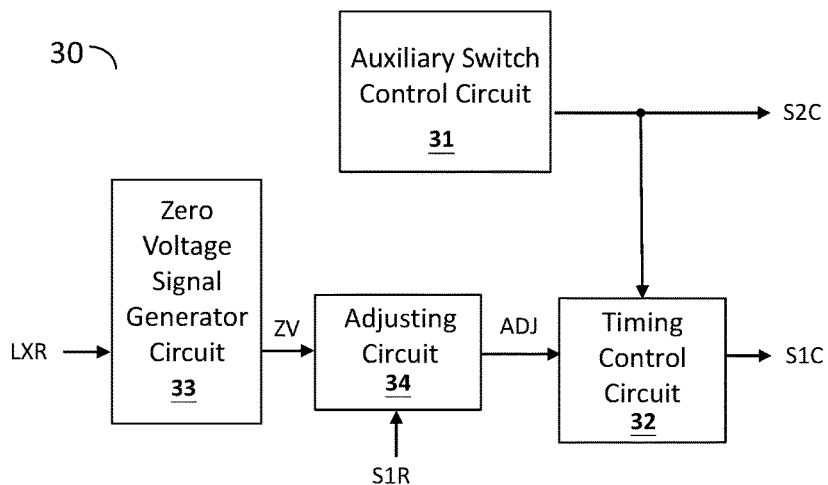
FIG. 4 shows a schematic diagram of a specific embodiment of the conversion control circuit of the flyback power converter circuit with active clamping and zero voltage switching according to the present invention.

Please refer to FIG. 4 which shows a schematic diagram of a specific embodiment of the conversion control circuit (conversion control circuit 30) of the flyback power converter circuit with active clamping and zero voltage switching according to the present invention. The conversion control circuit 30 includes an auxiliary switch control circuit 31, a timing control circuit 32, a zero voltage signal generator circuit, and an adjusting circuit 34. The auxiliary switch control circuit 31 generates an auxiliary switch control signal S2C to control the auxiliary switch S2. The timing control circuit 32 generates the primary side switch control signal S1C according to the auxiliary switch control signal S2C and an adjusting signal ADJ, to control the primary side switch S1. The zero voltage signal generator circuit 33 determines a zero crossing time point according to the switching voltage related signal LXR and generate a zero voltage signal ZV to represent the zero crossing time point, wherein the zero crossing time point indicates a time point when the voltage difference between the current inflow terminal and the current outflow terminal of the primary side switch S1 is reaching or crossing zero. The adjusting circuit 34 adjusts the auxiliary dead time TD according to the primary side switch related signal S1R and the zero voltage signal ZV, such that the primary side switch is zero voltage switching at the time point when the primary side switch S1 is turned ON.

Still referring to FIG. 4, in one embodiment, the adjusting circuit 34 adjusts the auxiliary dead time TD by the adjusting signal ADJ, such that a primary side turning ON time point substantially aligns the zero crossing time point, whereby the primary side switch S1 is zero voltage switching at the time point when the primary side switch S1 is turned ON. The "primary side turning ON time point" refers to a time point when the primary side switch related signal S1R indicates that the primary side switch S1 is turned ON.

"Substantially align" means that the time point when the primary side switch related signal S1R indicates that the primary side switch S1 is turned ON happens substantially at the same time as the zero crossing time point. Since there may be signal processing delay, certain time difference between the primary side switch related signal S1R and the time point when the primary side switch is turned ON is tolerable, and therefore "substantially align" may allow a predetermined time difference between the time point when the primary side switch related signal S1R indicates that the primary side switch S1 is turned ON and the zero crossing time point. In the context of the present invention, the term "substantially" means that a deviation within a tolerable degree is acceptable.

Still referring to FIG. 4, in one embodiment, the timing control circuit 32 determines a dead time adjustment amount of the auxiliary dead time TD according to the adjusting signal ADJ to adjust the auxiliary dead time TD, and at the time point when the auxiliary dead time TD ends, the primary side switch S1 is controlled to turn ON by the primary side switch control signal S1C. The adjusting circuit 34 generates the adjusting signal ADJ according to a phase difference of the zero voltage signal ZV and the primary side switch related signal S1R. In one embodiment, when the phase difference indicates that the zero crossing time point is later than the primary side turning ON time point, the auxiliary dead time TD is lengthened by the adjusting signal ADJ, and when the phase difference indicates that the zero crossing time point is earlier than the primary side turning ON time point, the auxiliary dead time TD is shortened by the adjusting signal ADJ, such that the primary side turning ON time point substantially aligns the zero crossing time point.

Note that according to the present invention, the zero voltage switching of the primary side switch S1 is achieved by adjusting the auxiliary dead time TD; therefore, the auxiliary switch S2 and the primary side switch S1 can be arranged to switch complementarily to each other (i.e. the ON time of the auxiliary switch S2 and the ON time of the primary side switch S1 are substantially complementary, excluding the auxiliary dead time TD), or can be arranged not to switch complementarily to each other (i.e. the ON time of the auxiliary switch S2 and the ON time of the primary side switch S1 are not complementary, excluding the auxiliary dead time TD).

Figure 5:
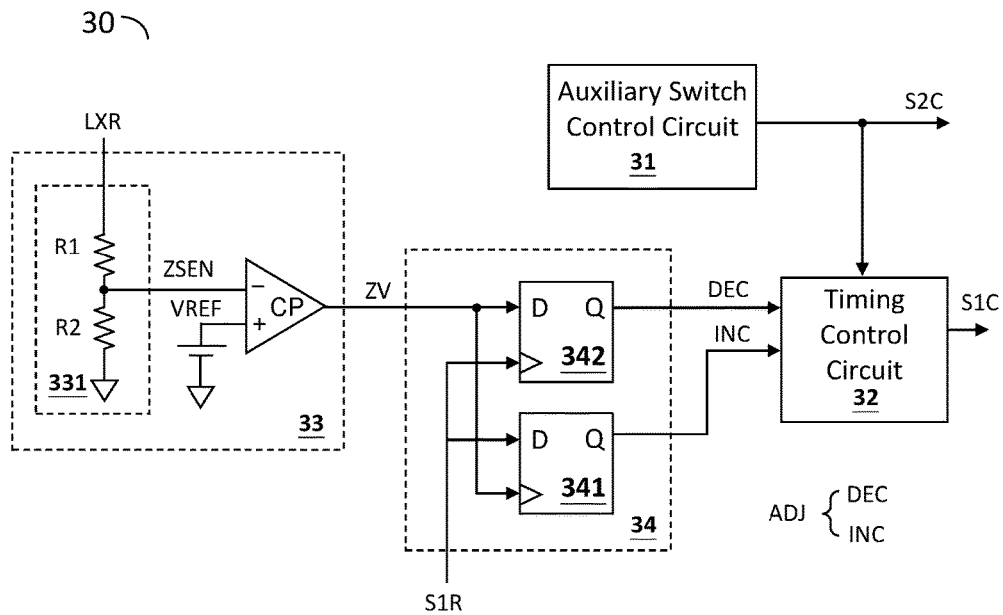
FIG. 5 shows a schematic diagram of another specific embodiment of the conversion control circuit of the flyback power converter circuit with active clamping and zero voltage switching according to the present invention.

FIG. 5 shows a schematic diagram of a specific embodiment of the conversion control circuit (conversion control circuit 30) of the flyback power converter circuit with active clamping and zero voltage switching according to the present invention. In this embodiment, the zero voltage signal generator circuit 33 includes a sensing circuit 331 and a comparison circuit CP. The sensing circuit 331 senses the switching voltage related signal LXR to generate a zero voltage sensing signal ZSEN. The zero voltage sensing signal ZSEN may be for example but not limited to the switching voltage related signal LXR. In one embodiment, as shown in the figure, the sensing circuit 331 is a voltage divider circuit and the zero voltage sensing signal ZSEN is a voltage division of the switching voltage related signal LXR. In one embodiment, the sensing circuit 331 may be a sampling circuit. The comparison circuit CP compares the zero voltage sensing signal ZSEN with a reference voltage VREF to generate the zero voltage signal ZV for use in representing the zero crossing time point.

Still referring to FIG. 5, in one embodiment, the adjusting circuit 34 includes a first state control circuit 341 and a second state control circuit 342 (for example but not limited to flip flop circuits as shown in the figure) which generate an increasing signal INC and a decreasing signal DEC respectively according to a level switching time point (for example but not limited to a rising edge or falling edge, the same hereinafter) of the zero voltage signal ZV and a level switching time point of the primary side switch related signal S1R, to adjust the dead time adjustment amount to lengthen or shorten the auxiliary dead time TD, wherein the adjusting signal ADJ includes the increasing signal INC and the decreasing signal DEC. In another embodiment, the first state control circuit 341 and the second state control circuit 342 may be embodied by latch circuits or other types of state control circuits.

Figure 6:
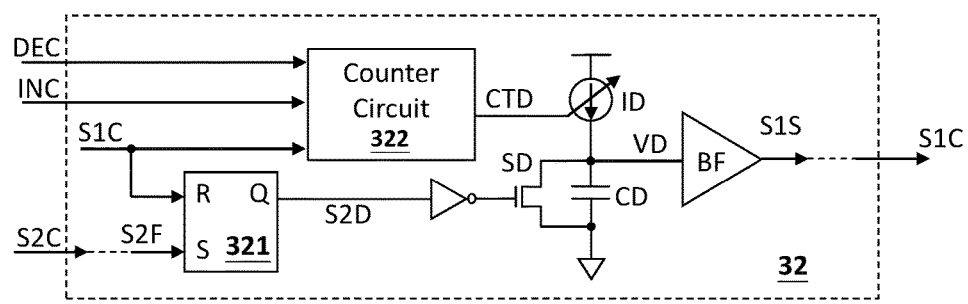
FIG. 6 shows a schematic diagram of a specific embodiment of the timing control circuit of the flyback power converter circuit with active clamping and zero voltage switching according to the present invention.

FIG. 6 shows a schematic diagram of a specific embodiment of the timing control circuit (timing control circuit 32) of the flyback power converter circuit with active clamping and zero voltage switching according to the present invention. The timing control circuit 32 includes a variable current source ID and an integration capacitor CD. The current of the variable current source ID is adjustable according to the adjusting signal ADJ. The integration capacitor CD determines the auxiliary dead time TD according to the current of the variable current source ID. More specifically, in one embodiment, the timing control circuit 32 includes a counter circuit 322 which generates a multi-bit current control signal CTD according to the adjusting signal ADJ (i.e. INC and DEC) to control the current of the variable current source ID. In another embodiment, the counter circuit may be replaced by a digital to analog converter circuit to convert the adjusting signal INC and DEC into the current control signal CTD in analog form to control the current of the variable current source ID, and the auxiliary dead time can also be adjusted thereby.

Figure 7:
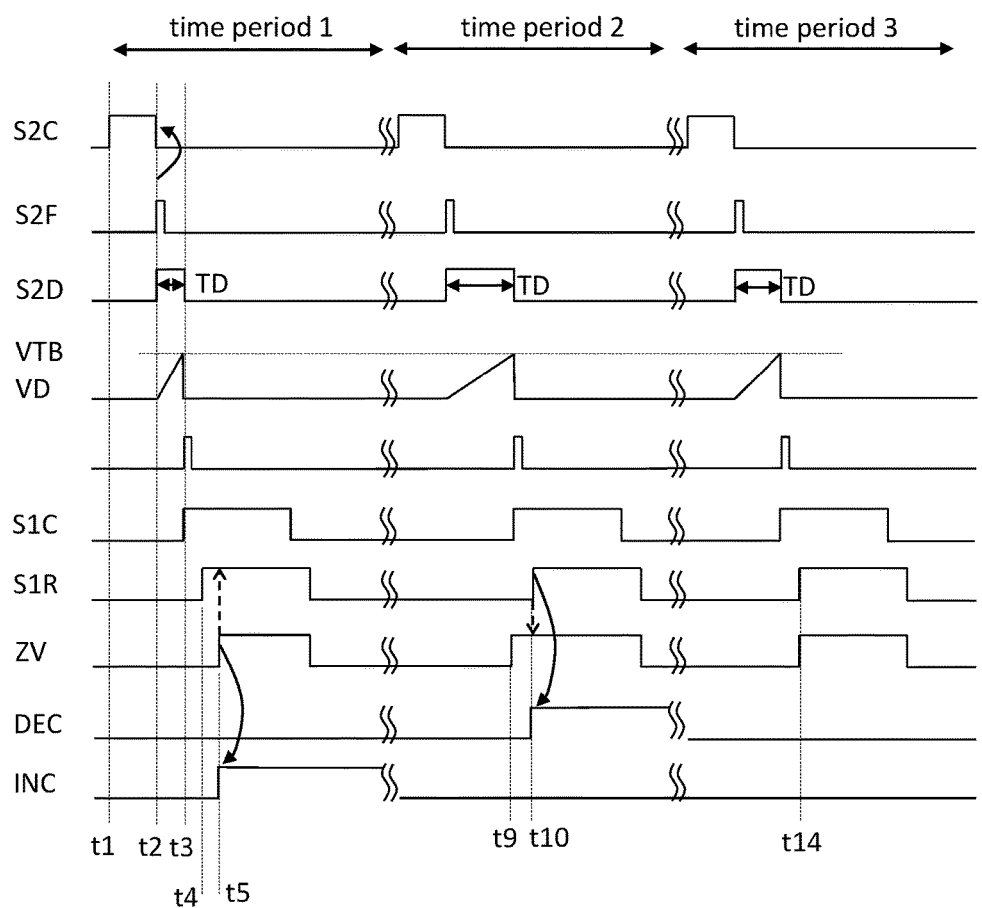
FIG. 7 shows schematic waveforms corresponding to the embodiments shown in FIGS. 3-5.

FIG. 7 shows schematic waveforms corresponding to embodiments shown in FIGS. 3-5. As shown in the figure, the auxiliary switch control signal S2C controls the auxiliary switch S2 to be turned ON at t1, and turned OFF at t2. The timing control circuit 32 starts counting the auxiliary dead time TD (corresponding to the integrated capacitor voltage VD shown in the figure) from the auxiliary switch S2 turning OFF (e.g. t2), and determines the time length of the auxiliary dead time TD (e.g. till t3) when VD achieves a predetermined voltage threshold (for example but not limited to a state transition voltage VTB of the buffer BF shown in FIG. 6), and controls the primary side switch S1 to turn ON by the primary side control signal S1C.

Still referring to FIG. 7, during the time period 1, the phase difference between the zero voltage signal ZV and the primary side switch related signal S1R indicates that the zero crossing time point (i.e. t5 in FIG. 7) is later than the primary side turning ON time point (i.e. t4 in FIG. 7). The adjusting circuit 34 hence adjusts the auxiliary dead time TD to increase from t5 by the adjusting signal INC which represents "increasing". During the time period 2, the phase difference between the zero voltage signal ZV and the primary side switch related signal S1R indicates that the zero crossing time point (i.e. t9 in FIG. 7) is earlier than the primary side turning ON time point (i.e. t10 in FIG. 7). The adjusting circuit 34 hence adjusts the auxiliary dead time TD to decrease from t10 by the adjusting signal DEC which represents "decreasing". During the time period 3, the phase difference between the zero voltage signal ZV and the primary side switch related signal S1R indicates that the zero crossing time point (i.e. t14 in FIG. 7) substantially aligns the primary side turning ON time point (i.e. t14 in FIG. 7). The adjusting circuit 34 hence neither increase nor decrease the auxiliary dead time TD by the adjusting signals INC and DEC.

Note that in the aforementioned embodiment, the relationship among the time periods 1, 2 and 3 are for illustration only; they do not necessarily neighbor each other as the embodiment shows. Besides, according to requirements or constraints of circuit design, the adjusting signals INC and DEC can be arranged to adjust the auxiliary dead time TD in a time period next to the time period when the adjusting signals are changed. Taking the embodiment in FIG. 6 as an example, the counter circuit 322 counts up or down according to the adjusting signal INC or DEC, and controls the variable current source ID according to the count. In another embodiment, the adjusting signals INC and DEC may be converted into an analog control signal to control the variable current source ID. Furthermore, in another embodiment, the adjusting signals INC and DEC may be delayed and then adjust the auxiliary dead time TD in a later time period or in plural time periods.

Also note that, the exemplary relationship between "increasing" or "decreasing" of the auxiliary dead time TD and the phase difference shown in the previous embodiment is for illustrative purpose but not for limiting. The auxiliary dead time TD can be adjusted in many different ways; for example, the adjustment need not be strictly increasing or decreasing. In summary, the spirit of the present invention is that the auxiliary dead time TD is adjusted according to the phase difference of the zero voltage signal ZV and the primary side switch related signal S1R so that the primary side switch S1 is zero voltage switching at the time point when the primary side switch S1 is turned ON, and all variations should be considered falling within the scope of the present invention.

Figure 8A:
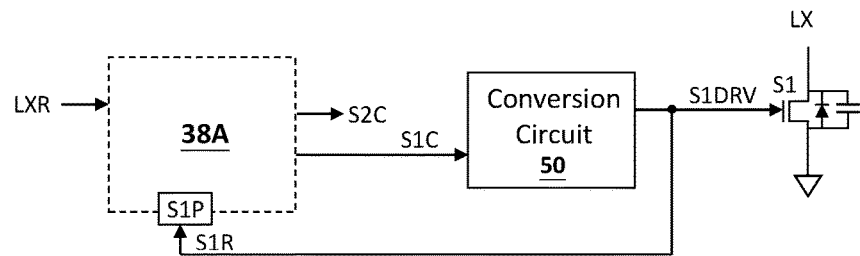
FIG. 8A shows a schematic diagram of another embodiment of the flyback power converter circuit with active clamping and zero voltage switching according to the present invention.
Figure 8B:
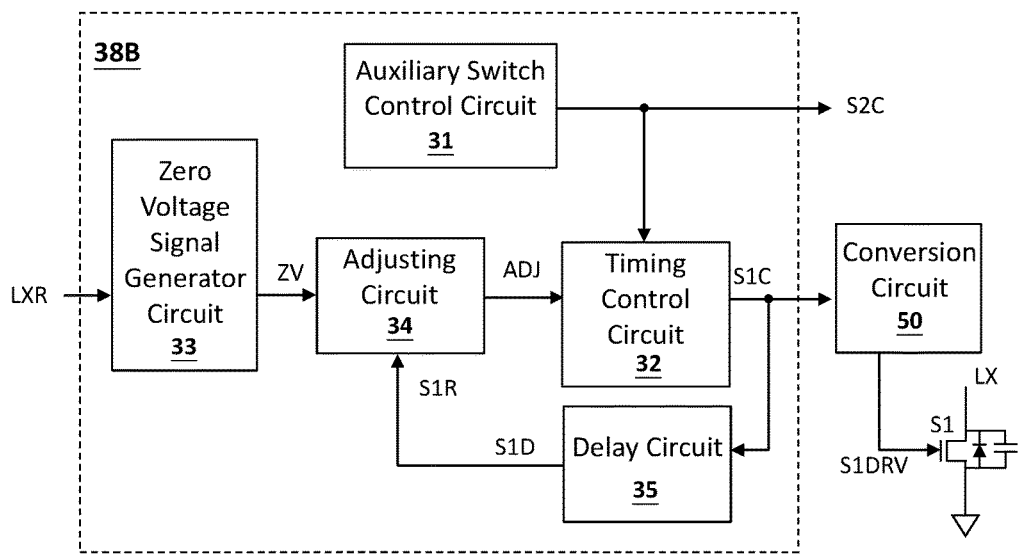
FIG. 8B shows a schematic diagram of another specific embodiment of the flyback power converter circuit with active clamping and zero voltage switching and the conversion control circuit thereof according to the present invention.

The primary side switch related signal S1R may be generated by various methods according to circuit structures of the flyback power converter circuit. Referring to FIG. 3, in one embodiment, the primary side control signal S1C is connected directly to the control terminal of the primary side switch S1 (i.e. the primary side switch driving signal S1DRV). In this case, the primary side switch related signal S1R may be connected directly to the primary side switch driving signal S1DRV (the same as the primary side switch control signal S1C). In one embodiment, the flyback power converter circuit may include a conversion circuit 50 (for example but not limited to a delay resistor and/or a driving circuit) which converts the primary side control signal S1C to the primary side switch driving signal S1DRV. FIG. 8A shows a schematic diagram of an embodiment of the flyback power converter circuit with active clamping and zero voltage switching and the conversion control circuit thereof according to the present invention (flyback power converter circuit 8A and conversion control circuit 38A). In this embodiment, with the conversion circuit 50, the primary side switch related signal S1R may still be electrically connected to the primary side switch driving signal S1DRV directly. For example, the conversion control circuit 38A includes an input pin SIP which is coupled to the primary side switch driving signal S1DRV. FIG. 8B shows a schematic diagram of another embodiment of the flyback power converter circuit with active clamping and zero voltage switching and the conversion control circuit thereof according to the present invention (flyback power converter circuit 8B and conversion control circuit 38B). In this embodiment, the primary side switch related signal S1R is coupled to a delayed control signal S1D, wherein the conversion control circuit 38B further includes a delay circuit 35 which generates a delayed control signal S1D according to the primary side switch control signal S1C, wherein the delayed control signal S1D is delayed by a predetermined delay time in comparison to the primary side switch control signal S1C, such that the delayed control signal S1D and the primary side switch driving signal S1DRV are substantially in-phase. From one perspective, when the primary side switch driving signal S1DRV cannot be accessed directly, the delayed control signal S1D emulates the primary side switch driving signal S1DRV to ensure that the primary side turning ON time point is correct, such that the primary side switch S1 is zero voltage switching at the time point when the primary side switch S1 is turned ON.

Figure 9A:
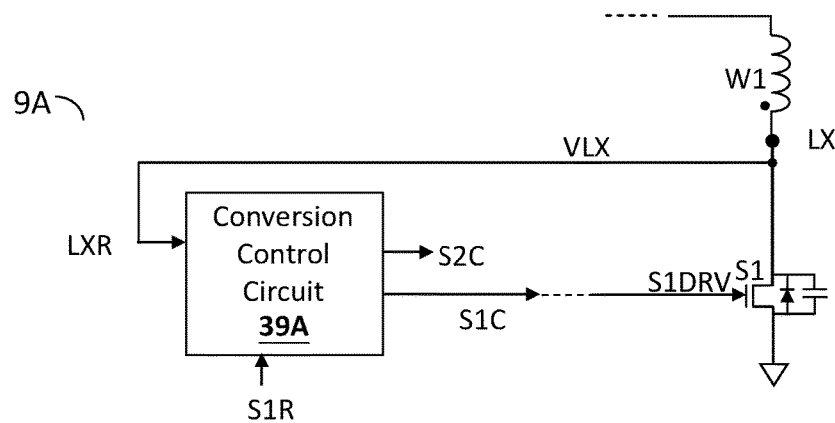
FIG. 9A shows a schematic diagram of another embodiment of the flyback power converter circuit with active clamping and zero voltage switching according to the present invention.

The switching voltage related signal LXR may be generated by various methods according to circuit structures of the flyback power converter circuit. FIG. 9A shows a schematic diagram of an embodiment of the flyback power converter circuit according to the present invention (flyback power converter circuit 9A). In this embodiment, the primary side switch S1 is coupled to the primary side winding W1 on an switching node LX on which a switching voltage VLX is generated. In this embodiment, the switching voltage related signal LXR is electrically connected to the switching voltage VLX.

Figure 9B:
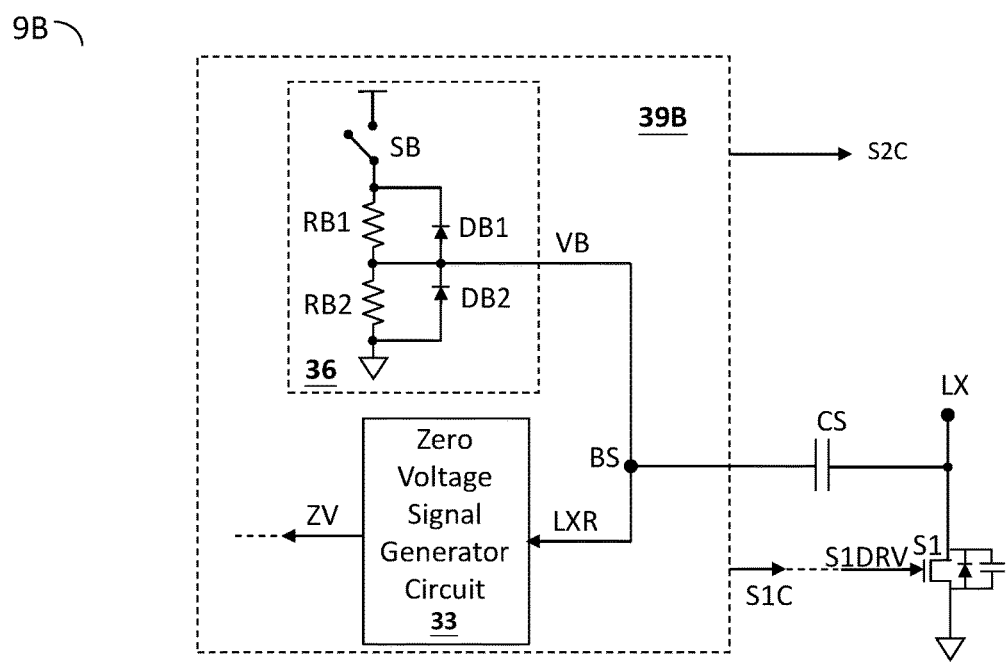
FIG. 9B shows a schematic diagram of another specific embodiment of the flyback power converter circuit with active clamping and zero voltage switching and the conversion control circuit thereof according to the present invention.

FIG. 9B shows a schematic diagram of another embodiment of the flyback power converter circuit according to the present invention (flyback power converter circuit 9B). The flyback power converter circuit 9B is similar to 9A, but is different in that the flyback power converter circuit 9B further includes a sensing capacitor CS, wherein the conversion control circuit 39B further includes a bias circuit 36 which provides a DC bias VB on a bias node BS. The sensing capacitor CS is coupled between the bias node BS and the switching node LX to generate the switching voltage related signal LXR on the bias node BS. In one embodiment, the bias circuit 36 includes for example but not limited to a resistive voltage divider circuit and a diode as shown in FIG. 9B for generating the DC bias VB. In another embodiment, the bias circuit 36 may be embodied by for example but not limited to a linear regulator.

Figure 9C:
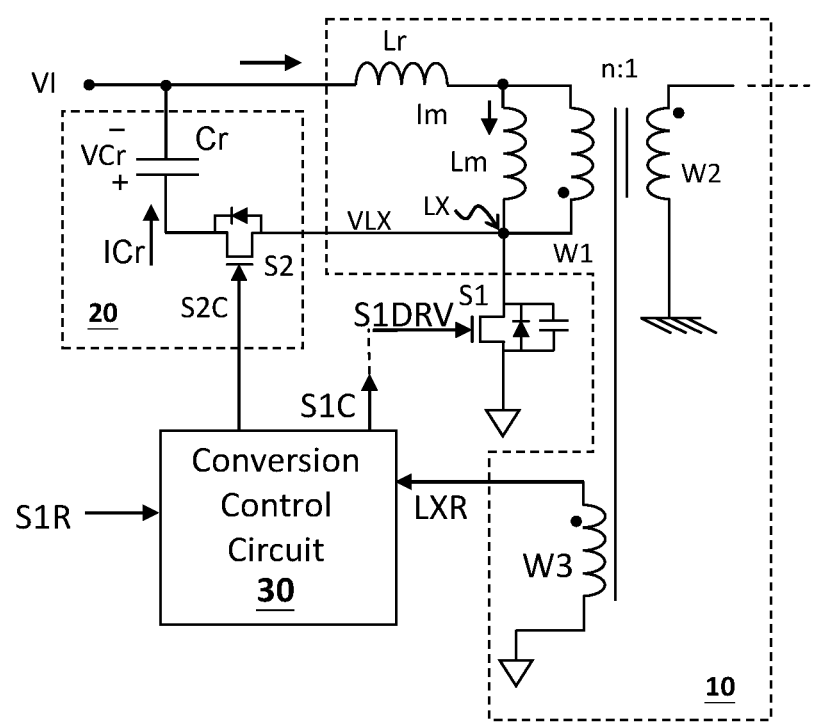
FIG. 9C shows a schematic diagram of another embodiment of the flyback power converter circuit with active clamping and zero voltage switching according to the present invention.

FIG. 9C shows a schematic diagram of a specific embodiment of the flyback power converter circuit according to the present invention (flyback power converter circuit 9C). In this embodiment, the transformer further includes an auxiliary winding W3 for generating the switching voltage related signal LXR.

The present invention has been described in considerable detail with reference to certain preferred embodiments thereof. It should be understood that the description is for illustrative purpose, not for limiting the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. Furthermore, those skilled in this art can readily conceive variations and modifications within the spirit of the present invention. For example, as described above, the "switching voltage related signal LXR" and the "primary side switch related signal S1R" maybe embodied in various methods respectively. And according to the present invention, those skilled in this art may combine the various embodiments of "switching voltage related signal LXR" and the "primary side switch related signal S1R" in various ways to adjust the auxiliary dead time so that the primary side switch S1 is zero voltage switching at the time point when the primary side switch S1 is turned ON. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. The spirit of the present invention should cover all such and other modifications and variations, which should be interpreted to fall within the scope of the following claims and their equivalents.

What is claimed is:
1. A flyback power converter circuit, comprising:
a transformer, which includes a primary side winding electrically coupled to an input power and a secondary side winding coupled to an output node, wherein the input power includes an input voltage;
a primary side switch, coupled to the primary side winding, and is configured to operably switch the primary side winding to convert the input power such that the secondary side winding generates an output power on the output node, wherein the output power includes an output voltage;
a clamping circuit, including:

an auxiliary switch; and
an auxiliary capacitor, coupled to the auxiliary switch in series to form an auxiliary branch which is coupled with the primary side winding in parallel; and
a conversion control circuit, including:
an auxiliary switch control circuit, configured to operably generate an auxiliary switch control signal to control the auxiliary switch; and
an adjusting circuit, configured to operably adjust an auxiliary dead time, such that a voltage difference between a current inflow terminal and a current outflow terminal of the primary side switch is substantially zero at a time point when the primary side switch is turned ON, whereby zero voltage switching is achieved;
wherein the auxiliary dead time is a time period starting from when the auxiliary switch is turned OFF till when the primary side switch is turned ON for the next time, wherein both the auxiliary switch and the primary side switch are OFF during the auxiliary dead time.

2. The flyback power converter circuit of claim 1, wherein the adjusting circuit generates an adjusting signal according to a primary side switch related signal and a zero voltage signal to adjust the auxiliary dead time, such that the primary side switch is zero voltage switching at the time point when the primary side switch is turned ON;
wherein the primary side switch related signal relates to a primary side switch control signal which controls the primary side switch;
wherein the zero voltage signal is configured to represent a zero crossing time point which indicates a time point when the voltage difference between the current inflow terminal and the current outflow terminal of the primary side switch is reaching or crossing zero.

3. The flyback power converter circuit of claim 2, wherein the conversion control circuit further includes a zero voltage signal generator circuit configured to operably determine the zero crossing time point according to a switching voltage related signal and generate the zero voltage signal to represent the zero crossing time point;
wherein the switching voltage related signal relates to the voltage difference between the current inflow terminal and the current outflow terminal of the primary side switch.

4. The flyback power converter circuit of claim 2, wherein the adjusting circuit adjusts the auxiliary dead time by the adjusting signal, such that a primary side turning ON time point substantially aligns the zero crossing time point, whereby the primary side switch is zero voltage switching at the time point when the primary side switch is turned ON, wherein the primary side turning ON time point is a time point when the primary side switch related signal indicates that the primary side switch is turned ON.

5. The flyback power converter circuit of claim 2, wherein the clamping circuit further includes a timing control circuit which is configured to operably generate the primary side switch control signal according to the auxiliary switch control signal and the adjusting signal to control the primary side switch;
wherein the timing control circuit determines a dead time adjustment amount of the auxiliary dead time according to the adjusting signal to adjust the auxiliary dead time, and at the time point when the auxiliary dead time ends, the primary side switch is controlled to turn ON by the primary side switch control signal;
wherein the adjusting circuit generates the adjusting signal according to a phase difference of the zero voltage signal and the primary side switch related signal such that the primary side turning ON time point substantially aligns the zero crossing time point.

6. The flyback power converter circuit of claim 5, wherein when the phase difference indicates that the zero crossing time point is later than the primary side turning ON time point, the auxiliary dead time is lengthened, and when the phase difference indicates that the zero crossing time point is earlier than the primary side turning ON time point, the auxiliary dead time is shortened.

7. The flyback power converter circuit of claim 3, wherein the zero voltage signal generator circuit includes:
a sensing circuit, configured to operably sense the switching voltage related signal to generate a zero voltage sensing signal; and
a comparison circuit, configured to operably compare the zero voltage sensing signal with a reference voltage to generate the zero voltage signal.

8. The flyback power converter circuit of claim 5, wherein the timing control circuit includes:
a variable current source, whose current is adjustable according to the adjusting signal; and
an integration capacitor, configured to determine the auxiliary dead time according to the current of the variable current source.

9. The flyback power converter circuit of claim 4, wherein the adjusting circuit includes a first state control circuit which generates an increasing signal according to a level switching time point of the zero voltage signal and a level switching time point of the primary side switch related signal and a second state control circuit which generates a decreasing signal according to the level switching time point of the zero voltage signal and the level switching time point of the primary side switch related signal, wherein the adjusting signal includes the increasing signal and the decreasing signal.

10. The flyback power converter circuit of claim 2, wherein the flyback power converter circuit generates a primary side switch driving signal according to the primary side switch control signal, wherein the primary side switch driving signal is directly coupled to a control terminal of the primary side switch to drive the primary side switch, wherein:
(1) the primary side switch related signal is coupled to the primary side switch driving signal; or
(2) the primary side switch related signal is coupled to a delayed control signal, wherein the conversion control circuit includes a delay circuit which is configured to operably generate the delayed control signal according to the primary side switch control signal, wherein the delayed control signal is not the primary side switch driving signal, and the delayed control signal is delayed by a predetermined delay time in comparison to the primary side switch control signal, such that the delayed control signal and the primary side switch driving signal are substantially in-phase.

11. The flyback power converter circuit of claim 3, wherein the primary side switch is coupled to the primary side winding on a switching node which has a switching voltage, wherein the switching voltage related signal is generated by one of the followings:
(1) that the switching voltage related signal is electrically connected to the switching voltage;
(2) that the flyback power converter circuit further includes a sensing capacitor, and the conversion control circuit further includes a bias circuit configured to operably provide a DC bias on a bias node, wherein the sensing capacitor is coupled between the bias node and the switching node to generate the switching voltage related signal on the bias node; or (3) that the transformer further includes an auxiliary winding to generate the switching voltage related signal.

12. The flyback power converter circuit of claim 1, wherein the auxiliary switch and the primary side switch do not switch complementarily to each other.

13. A conversion control circuit, configured to operably control a flyback power converter circuit which includes: a transformer, which includes a primary side winding electrically coupled to an input power and a secondary side winding coupled to an output node, wherein the input power includes an input voltage; a primary side switch, coupled to the primary side winding, and is configured to operably switch the primary side winding to convert the input power such that the secondary side winding generates an output power on the output node, wherein the output power includes an output voltage; a clamping circuit, including: an auxiliary switch; and an auxiliary capacitor, coupled to the auxiliary switch in series to form an auxiliary branch which is coupled with the primary side winding in parallel; the conversion control circuit comprising:

an auxiliary switch control circuit, configured to operably generate an auxiliary switch control signal to control the auxiliary switch; and an adjusting circuit, configured to operably adjust an auxiliary dead time, such that a voltage difference between a current inflow terminal and a current outflow terminal of the primary side switch is substantially zero at a time point when the primary side switch is turned ON, whereby zero voltage switching is achieved;

wherein the auxiliary dead time is a time period starting from when the auxiliary switch is turned OFF to when the primary side switch is turned ON for the next time, wherein both the auxiliary switch and the primary side switch are OFF during the auxiliary dead time.

14. The conversion control circuit of claim 13, wherein the adjusting circuit generates an adjusting signal according to a primary side switch related signal and a zero voltage signal to adjust the auxiliary dead time, such that the primary side switch is zero voltage switching at the time point when the primary side switch is turned ON;

wherein the primary side switch related signal relates to a primary side switch control signal which controls the primary side switch;

wherein the zero voltage signal is configured to represent a zero crossing time point which indicates a time point when the voltage difference between the current inflow terminal and the current outflow terminal of the primary side switch is reaching or crossing zero.

15. The conversion control circuit of claim 14, wherein the conversion control circuit further includes a zero voltage signal generator circuit configured to operably determine the zero crossing time point according to a switching voltage related signal and generate the zero voltage signal to represent the zero crossing time point;

wherein the switching voltage related signal relates to the voltage difference between the current inflow terminal and the current outflow terminal of the primary side switch.

16. The conversion control circuit of claim 14, wherein the adjusting circuit adjusts the auxiliary dead time by the adjusting signal, such that a primary side turning ON time point substantially aligns the zero crossing time point, whereby the primary side switch is zero voltage switching at the time point when the primary side switch is turned ON, wherein the primary side turning ON time point is a time point when the primary side switch related signal indicates that the primary side switch is turned ON.

17. The conversion control circuit of claim 14, wherein the clamping circuit further includes a timing control circuit which is configured to operably generate the primary side switch control signal according to the auxiliary switch control signal and the adjusting signal to control the primary side switch;

wherein the timing control circuit determines a dead time adjustment amount of the auxiliary dead time according to the adjusting signal to adjust the auxiliary dead time, and at the time point when the auxiliary dead time ends, the primary side switch is controlled to turn ON by the primary side switch control signal;

wherein the adjusting circuit generates the adjusting signal according to a phase difference of the zero voltage signal and the primary side switch related signal such that the primary side turning ON time point substantially aligns the zero crossing time point.

18. The conversion control circuit of claim 15, wherein when the phase difference indicates that the zero crossing time point is later than the primary side turning ON time point, the auxiliary dead time is lengthened, and when the phase difference indicates that the zero crossing time point is earlier than the primary side turning ON time point, the auxiliary dead time is shortened.

19. The conversion control circuit of claim 15, wherein the zero voltage signal generator circuit includes:

a sensing circuit, configured to operably sense the switching voltage related signal to generate a zero voltage sensing signal; and a comparison circuit, configured to operably compare the zero voltage sensing signal with a reference voltage to generate the zero voltage signal.

20. The conversion control circuit of claim 17, wherein the timing control circuit includes:

a variable current source, whose current is adjustable according to the adjusting signal; and an integration capacitor, configured to determine the auxiliary dead time according to the current of the variable current source.

21. The conversion control circuit of claim 16, wherein the the adjusting circuit includes a first state control circuit which generates an increasing signal according to a level switching time point of the zero voltage signal and a level switching time point of the primary side switch related signal and a second state control circuit which generates a decreasing signal according to the level switching time point of the zero voltage signal and the level switching time point of the primary side switch related signal, wherein the adjusting signal includes the increasing signal and the decreasing signal.

22. The conversion control circuit of claim 14, wherein the flyback power converter circuit generates a primary side switch driving signal according to the primary side switch control signal, wherein the primary side switch driving signal is directly coupled to a control terminal of the primary side switch to drive the primary side switch, wherein:

(1) the primary side switch related signal is coupled to the primary side switch driving signal; or (2) the primary side switch related signal is coupled to a delayed control signal, wherein the conversion control circuit includes a delay circuit which is configured to operably generate the delayed control signal according to the primary side switch control signal, wherein the delayed control signal is not the primary side switch driving signal, and the delayed control signal is delayed by a predetermined delay time in comparison to the primary side switch control signal, such that the delayed control signal and the primary side switch driving signal are substantially in-phase.

23. The conversion control circuit of claim 15, wherein the primary side switch is coupled to the primary side winding on a switching node which includes a switching voltage, wherein the switching voltage related signal is generated by one of the followings:
   (1) that the switching voltage related signal is electrically connected to the switching voltage;
   (2) that the flyback power converter circuit further includes a sensing capacitor, and the conversion control circuit further includes a bias circuit configured to operably provide a DC bias on a bias node, wherein the sensing capacitor is coupled between the bias node and the switching node to generate the switching voltage related signal on the bias node; or
   (3) that the transformer further includes an auxiliary winding to generate the switching voltage related signal.

24. The conversion control circuit of claim 13, wherein the auxiliary switch and the primary side switch do not switch complementarily to each other.

* * * * *